United States Patent [19]

Randall

[11] Patent Number: 4,734,736
[45] Date of Patent: Mar. 29, 1988

[54] RECIRCULATING DOCUMENT FEEDER

[75] Inventor: Kent A. Randall, Rochester, N.Y.

[73] Assignee: Eastman Kodak Company, Rochester, N.Y.

[21] Appl. No.: 892,650

[22] Filed: Aug. 4, 1986

[51] Int. Cl.$^4$ .................... G03G 21/00; B65H 5/22
[52] U.S. Cl. ................ 355/14 SH; 271/3.1; 271/291; 271/902; 355/24
[58] Field of Search ............... 355/3 SH, 14 SH, 23, 355/24; 271/3.1, 291, 902

[56] References Cited

U.S. PATENT DOCUMENTS

| | | | |
|---|---|---|---|
| 2,752,154 | 6/1956 | Nelson | 271/196 |
| 4,089,515 | 5/1978 | Stange et al. | 271/3 |
| 4,140,387 | 2/1979 | Gustafson | 355/23 X |
| 4,158,500 | 6/1979 | Di Francesco et al. | 355/23 X |
| 4,186,662 | 2/1980 | Borneman | 101/218 |
| 4,272,181 | 6/1981 | Treseder | 355/14 SH |
| 4,384,782 | 5/1983 | Acquaviva | 355/3 SH |
| 4,412,740 | 11/1983 | Buddendeck et al. | 355/14 SH |
| 4,431,303 | 2/1984 | Hoffman | 355/3 SH |

*Primary Examiner*—Fred L. Braun
*Attorney, Agent, or Firm*—Lawrence P. Kessler

[57] ABSTRACT

A document feeder for recirculating simplex or duplex document sheets in a sheet stack to and from a scanning station of a reproduction apparatus of the type including a donor/transfer member for producing simplex or duplex copies of simplex or duplex document sheets. The recirculating feeder includes a hopper for holding the document sheets and a first cylinder located in spaced relation to the hopper and in juxtaposition with the scanning station. The first cylinder is capable of having a document sheet tacked to its peripheral surface. Second and third cylinders, capable of having a document sheet tacked to their respective peripheral surfaces, are located between the hopper and the first cylinder in nip relation with the first cylinder and one another. The cylinders are bidirectionally rotatable about their respective longitudinal axes. A document sheet is transportable from the hopper into the nip relation between the second and third cylinders. Rotation of the cylinders, transport of a document sheet and tacking of a sheet to a particular cylinder are controlled for effecting transport of simplex or duplex document sheets seriatem from the hopper past the scanning station and back to the hopper in proper orientation and direction of transport to enable the desired production of simplex or duplex copies.

8 Claims, 9 Drawing Figures

RECIRCULATING DOCUMENT FEEDER

BACKGROUND OF THE INVENTION

This invention relates generally to recirculating document feeders, and more particularly to a recirculating document feeder for use with an electrophotographic apparatus wherein a document is transported in relation to an optical path for scan exposure of such document, and having a donor/transfer member for producing simplex or duplex copies of simplex or duplex original documents.

Electrographic reproduction apparatus typically produce copies of original information on receiver members, such as cut sheets of plain bond paper for example. Such information copies may be formed on one side of the paper sheets (referred to as simplex copies), or on both sides of such sheets (referred to as duplex copies). Commercial electrographic reproduction apparatus capable of producing duplex copies are classified as "two-pass" or "single-pass" apparatus.

In "two-pass" reproduction apparatus, selected information is electrographically reproduced sequentially on the first sides of sheets respectively. Such sheets are collected in an intermediate tray and then sequentially transported from the intermediate tray back through the apparatus to have selected information respectively reproduced electrographically on the second sides of such sheets. As a result, a relatively long travel path is required for transporting sheets through the reproduction apparatus twice to produce the duplex copies. Therefore, the potential for jams or other sheet handling complications is increased. Moreover, the first completed duplex copy is not available for inspection until after all first side copies are produced. Thus considerable time elapses until the first complete duplex copy is produced, and any errors in such duplex copy are not determined until after all first side copies have already been made. Moreover, in reproducing a multipage information document, handling of the document pages requires complex logic in that all even sides must be reproduced and collected before all odd sides are reproduced (or vice-versa).

In "single-pass" reproduction apparatus, selected information is electrographically produced respectively on both sides of a sheet during a single pass through such apparatus. While single-pass apparatus are successful in overcoming the noted disadvantages of two-pass electrographic reproduction apparatus, they tend to introduce, in and of themselves, other disadvantages or complications. For example, U.S. Pat. No. 3,775,102 (issued Nov. 27, 1973, in the name of Punnett) shows two separate substantially complete electrographic process assemblies for reproducing information respectively on each side of a sheet. Such duplicative assemblies require precise optical alignment, substantially increase apparatus cost, and add significant complexity (with reduced reliability) to the apparatus.

To eliminate duplicative process assemblies, a single-pass reproduction apparatus may employ an electrically biased donor/transfer roller for simultaneously transferring images, corresponding to information to be reproduced, respectively to each side of a receiver sheet, such as shown for example in U.S. Pat. No. 3,844,654 (issued Oct. 29, 1974, in the name of Guenther). With a doner/transfer roller, respective transferable images must be of reversed orientation (i.e. one right-reading and one wrong-reading) when initially formed so as to transfer right-reading to the receiver sheet. As shown in the arrangement of the aforementioned '654 patent, reversal of the orientation of the transferable images has been accomplished, for example, by complex optical systems with plural scanning stations and complicated document transport mechanisms. Moreover, with such arrangements direct production of simplex or duplex copies from simplex or duplex document sheets is not readily accomplished having separate optical paths and moving mirrors.

SUMMARY OF THE INVENTION

This invention is directed to a document feeder for recirculating simplex or duplex document sheets in a sheet stack to and from a scanning station of a reproduction apparatus of the type including a donor/transfer member for producing simplex or duplex copies of simplex or duplex document sheets. The recirculating feeder includes a hopper for holding the document sheets and a first cylinder located in spaced relation to the hopper and in juxtaposition with the scanning station. The first cylinder is capable of having a document sheet tacked to its peripheral surface. Second and third cylinders, capable of having a document sheet tacked to their respective peripheral surfaces, are located between the hopper and the first cylinder in nip relation with the first cylinder and one another. The cylinders are bidirectionally rotatable about their respective longitudinal axes. A document sheet is transportable from the hopper into the nip relation between the second and third cylinders. Rotation of the cylinders, transport of a document sheet and tacking of a sheet to a particular cylinder are controlled for effecting transport of simplex or duplex document sheets seriatem from the hopper past the scanning station and back to the hopper in proper orientation and direction of transport to enable the desired production of simplex or duplex copies.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENTS

Figure 1:
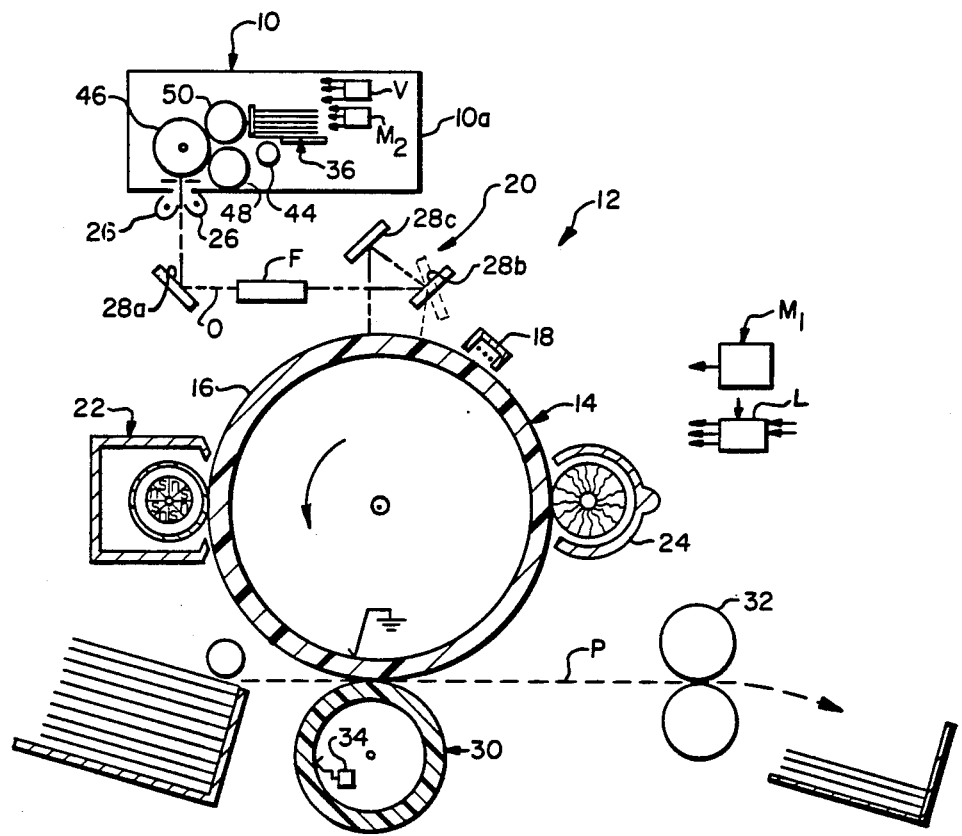
FIG. 1 is a schematic illustration of an exemplary reproduction apparatus and a recirculating document feeder according to this invention.

Referring now to the accompanying drawings, FIG. 1 shows a recirculating document feeder, according to this invention, generally designated by the numeral 10 in association with an exemplary donor/transfer type reproduction apparatus generally designated by the numeral 12. The reproduction apparatus 12 includes a member 14, associated with electrographic process stations, upon which marking particle developed, transferable images of original information are formed by the operation of such process stations. The member 14 is, for example, a drum 16 mounted in the apparatus 12 for rotation in a counter-clockwise direction about its longitudinal axis. The peripheral surface of the drum 16 has a composite construction including a photoconductive layer and a grounding support layer, such as shown in U.S. Pat. No. 3,615,414 (issued Oct. 26, 1971, in the name of Light) for example. Of course, the member 14 could alternatively comprise a closed loop web formed of similar composite construction. The electrographic process stations include a charging apparatus 18, a single optical path exposure mechanism 20, a developer apparatus 22, and a cleaning mechanism 24.

Under the control of a logic and control unit L, a motor $M_1$ rotates the drum 16 through operative relation with the electrographic process stations. The unit L includes, for example, a microprocessor receiving operator input signals and timing signals based on the angular position of the drum 16 about its longitudinal axis. Based on such signals and a program for the microprocessor, the unit L produces signals to control the rotation of the drum 16 and the operation of the various electrographic process stations for carrying out the reproduction process. The production of a program for a number of commercially available microprocessors such as INTEL model 8080 or model 8085 microprocessor (which along with others are suitable for use with the invention), is a conventional skill well understood in the art. The particular details of any such program would, of course, depend on the architecture of the designated microprocessor.

In the particular operation of the apparatus 12, the motor $M_1$ rotates the drum 16 in a counter-clockwise direction to move a portion of the photoconductive layer of its peripheral surface past the charging apparatus 18 which is, for example, a corona charger electrically coupled to a potential source (not shown). The charging apparatus 18 deposits a uniform electrostatic charge on such portion of the drum surface, and such portion then moves past the exposure mechanism 20. The mechanism 20 includes, lamps 26 which illuminate a document handled by feeder 10 in the manner to be explained hereinbelow. A reflected light image of such document is projected in successive line segments along an optical path O onto the photoconductive layer of the peripheral surface of the rotating drum 16. Accordingly, such line segments of the reflected light image of the document expose the photoconductive layer and alter the uniform charge pattern thereon to form a charge pattern corresponding to such image.

After the charge pattern is formed on the photoconductive layer, the portion of the surface of the drum 16 bearing such pattern is moved into operative contact with the developer apparatus 22. The developer 22, which may be, for example, a magnetic brush developer of the type described in U.S. Pat. No. 3,457,900 (issued July 29, 1969 in the name of Drexler), brings pigmented marking particles into contact with the photoconductive layer. Such particles adhere to the charge pattern on such layer to develop the pattern into a transferable image. The transferable image is transferred to a receiver sheet, transported along a path P, by a donor/transfer roller 30. After transfer, the portion of the photoconductive layer from which such image was removed is cleaned of any residual marking particles by cleaning mechanism 24 (a rotating fur brush for example) and returned to a location relative to the charging apparatus 18 for reuse. Simultaneously, the receiver member bearing the transferred image is transported through a fusing mechanism 32 where the image is fixed thereto by heat and/or pressure for example.

The donor/transfer roller 30 is coupled to a source of electrical potential 34 and has a peripheral surface exhibiting properties which enable it to selectively receive or release marking particles under the influence of an electrostatic field produced by such potential source. In order to produce duplex copies, a first transferable image is received on the peripheral surface of the donor/transfer roller 30 rather than on a receiver sheet, and is thereafter transferred to one side of a receiver sheet as a second transferable image is simultaneously transferred directly from the drum 16 to the opposite side of the receiver sheet. Since the first transferable image is, in effect, transferred twice while the second transferable image is transferred only once, the images must be formed in opposite reading orientation on the drum 16 to both be of right-reading orientation on the receiver sheet. Accordingly, in forming the image transferrable from the drum 16 to the roller 30 and then to a receiver sheet, the optical path O from the lens F to the drum 16 is defined by a mirror 28b located in its solid line position of FIG. 1 to project the image to a mirror 28c and then onto the drum 16 (wrong-reading); and in forming the image transferrable from the drum 16 directly to a receiver sheet, the optical path from the lens to the drum is defined by the mirror 28b located in its broken line position of FIG. 1 to project the image directly onto the drum 16 (right-reading). The change in the optical path O by the insertion (or deletion) of a mirror imposes a requirement for reversing the direction of travel of the document sheet across the optical path O during scanning to assure proper image formation on the drum 16. The feeder 10, according to this invention, transports documents in a manner to assure proper transferable image formation on the drum.

Figure 2:
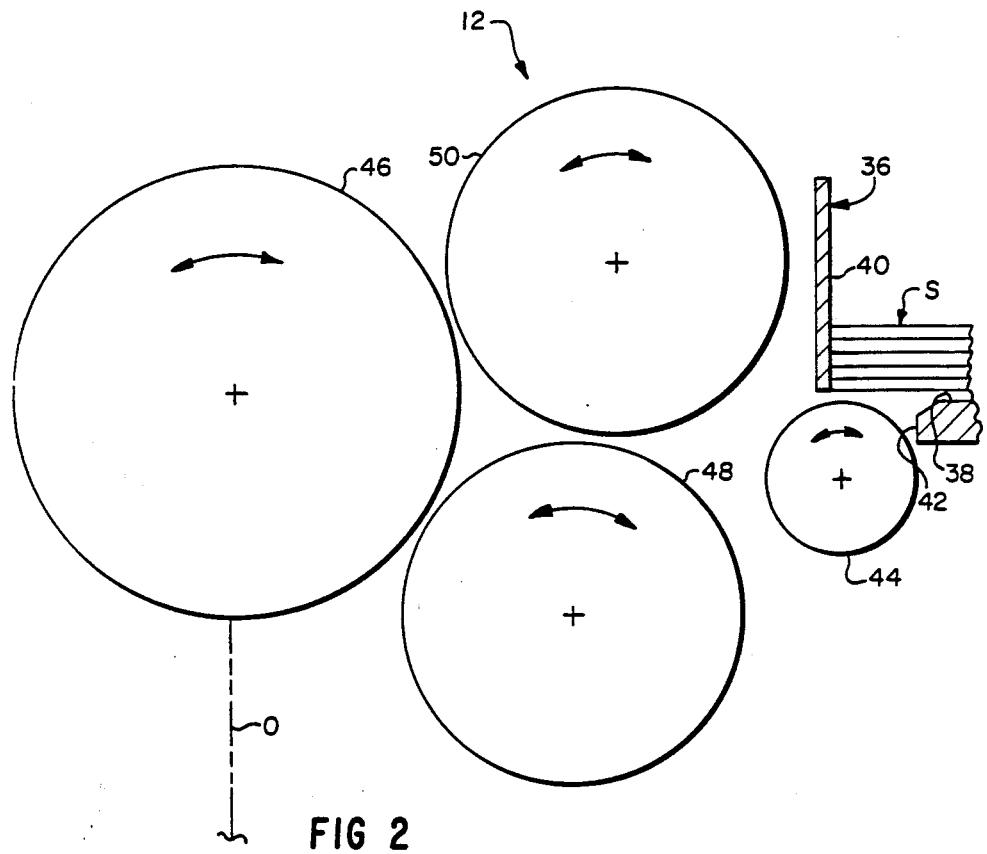
FIG. 2 is a side elevational view of the recirculating document feeder according to this invention with portions shown schematically or removed to facilitate viewing.

The feeder 10 comprises a housing 10a. A hopper 36 is supported in the housing 10a. The hopper 36 includes a tray 38 for supporting a stack of document sheets S and an upstanding front wall 40 against which the lead edge of the document stack is registered (see FIG. 2). The tray 38 has an opening 42 underlying that portion of the stack registered against front wall 40. A transport mechanism 44, such as an oscillating vacuum feed roller for example, is located in juxtaposition with the opening 42. The transport mechanism 44 is selectively actuated by the logic and control unit L to feed the bottom-most document sheet from the sheet stack S.

The portion of the feeder 10 for transporting a document sheet in the appropriate direction relative to the exposure mechanism 20 for forming properly oriented images of simplex or duplex documents for producing simplex or duplex copies includes three transport cylinders 46, 48 and 50. Such transport cylinders are mounted in the housing 10a, in parallel relationship, for rotation about their respective longitudinal axes (see FIG. 1). The cylinder 46 is located in juxtaposition with the exposure mechanism 20 so that the optical path O intercepts such cylinder, and cylinders 48 and 50 are located between the cylinder 46 and the hopper 36 in substantial nip relation with cylinder 46 and one another. The cylinders each have a ported peripheral surface (not shown) and, under control of unit 1 are selectively coupled to a vacuum source V to tack a document sheet to their respective peripheral surface for transportation therewith. Of course, other mechanisms for tacking a sheet to the cylinders, such as mechanical clamps for example, are suitable for use with this invention. Further the cylinders are selectively coupled respectively to a motor $M_2$ in any well known manner. The motor $M_2$ is under the control of the logic and control unit 1 to rotate the respective cylinders at the appropriate time in either direction about their longitudinal axes.

By this arrangement, the feeder 10, under control of unit 1, is capable of transporting document sheets to and from the exposure station 20 in the appropriate directions to enable simplex copies to be made of simplex or duplex document sheets and duplex copies to be made of simplex or duplex document sheets. The operation of the feeder in its various modes will be described hereinbelow with particular reference to FIGS. 3 through 6b.

Figure 3:
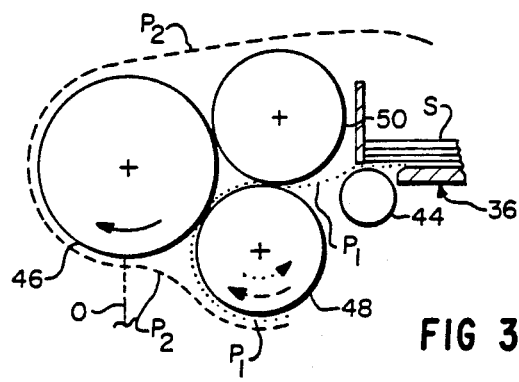
FIG. 3 is a side elevational view of the feeder of FIG. 1 showing its operation for enabling the production of simplex copies of simplex documents.

The mode of operation of the feeder 10 for forming simplex copies of simplex document sheets is shown in FIG. 3. The document sheets in the stack S are in page sequential order, the First page on top (i.e., information side of each sheet face up in the hopper 36). The document sheets are transported seriatem from the bottom of the stack S by mechanism 44 with the first sheet to be copied being the last page of the document stack. The document sheet is directed along path $P_1$ (dotted line) to the peripheral surface of cylinder 48, rotatably driven in a counter-clockwise direction by motor $M_2$. The sheet is tacked to the peripheral surface by application of vacuum from source V with the information side of such sheet facing away from such surface. Rotation of the cylinder continues until the trail edge of such sheet is substantially beyond the point of nip relation between cylinders 46 and 48. At this point in time, rotation of the cylinder 48 is reversed and the trail edge of document sheet becomes the lead edge. Substantially simultaneously, the cylinder 46 is rotated in a clockwise direction and vacuum from source V is applied thereto. The lead edge of document sheet is stripped from cylinder 48 by any well known stripped mechanism, such as for example by mechanical skives (not shown), and directed toward cylinder 46 where such lead edge is tacked thereto. The cylinder 46 then transports the document sheet along the path $P_2$ (dashed line) past the optical path O of exposure mechanism 20, with the information side facing the exposure mechanism. With the mirror 28b in its broken line position of FIG. 1, the document sheet is thus moving in the proper direction for forming a wrong-reading image on the drum 16. Such image is thereafter developed and transferred directly right-reading to a receiver sheet as described above. After exposure, transport of the document sheet continues along path $P_2$ back to the hopper 36 where it is received in its original orientation (i.e., with its information side remaining face up). This cycle is repeated for each simplex document sheet in the stack S a number of times corresponding to a preselected desired number of copies of such stack. The resultant desired number of simplex copies are thus produced, such production occurring in page sequential order.

Figure 4A:
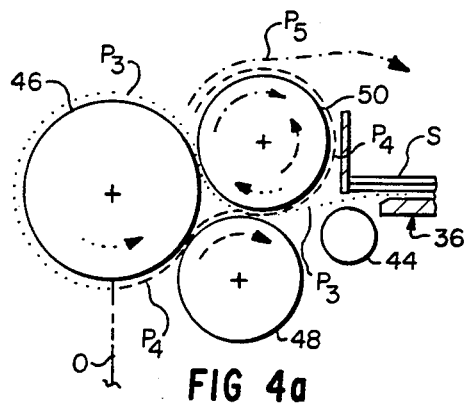
FIGS. 4a and 4b are side elevational views of the feeder of FIG. 1 showing its operation for enabling the production of duplex copies of simplex documents.
Figure 4B:
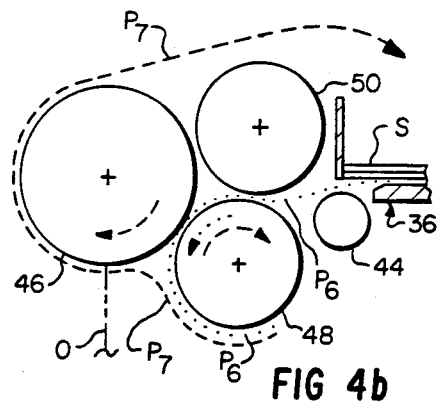

The mode of operation of the feeder 10 for forming duplex copies of simplex document sheets is shown in FIGS. 4a, 4b. As above, the document sheets in the stack S are in page sequential order, the first page on top, information side face up. The number of sheets in the stack must be even. Therefore, if the number of document sheets is odd, a blank sheet is added to the bottom of the stack. The bottom-most sheet is transported from the stack S by mechanism 44 and is directed along the path $P_3$ (dotted line) in FIG. 4a to the peripheral surface of cylinder 50. The cylinder 50 is rotated by motor $M_2$ in a clockwise direction and the sheet is tacked to the peripheral surface of such cylinder by application of vacuum from source V. The sheet is then immediately handed off to cylinder 46 which is being rotated in a counter-clockwise direction and which has vacuum applied thereto to tack the sheet to its peripheral surface with the information side of such sheet facing away from surface. The sheet is then transported past the optical path O of exposure mechanism 20, with the information side facing the exposure mechanism. With the mirror 28b in its solid line position of FIG. 1, the document sheet is thus moving in the proper direction for forming a right-reading image on the drum 16. Such image is thereafter developed and transferred wrong-reading to the donor/transfer roller 30 and then right-reading to the back side of a receiver sheet as described above. After exposure, the document sheet is transported along the path $P_4$ (dashed line) to be handed off from the cylinder 46 to the cylinder 48 (rotating clockwise) at the nip therebetween, and then handed off from cylinder 48 to the cylinder 50 at the nip therebetween, with the cylinder 50 being rotated in a counter-clockwise direction. When the document sheet is completely received on the peripheral surface of cylinder 50 and its trail edge moves past top dead center, the rotational drive for such cylinder is reversed and the document sheet is transported back along path $P_5$ (dot/dash line) to the hopper where it is received in its original (i.e. face up) orientation.

While the previous document sheet is being transported along path $P_5$ for return to the hopper 36, the next bottom-most sheet is transported by the feeder 10 in the appropriate direction past the optical path O of exposure mechanism 20 and back to the hopper 36 along path $P_6$ (dotted line) and $P_7$ (dashed line) as shown in FIG. 4b, and in the manner described above with reference to FIG. 3. The logic and control unit L controls the timing of operation of the feeder 10 and the reproduction apparatus 12 in the manner described above such that the images formed from the first document sheet and from the subsequent document sheet are transferred simultaneously to opposite sides of the same receiver sheet to produce the desired duplex copy. This cycle is repeated, alternating between the operation depicted in FIG. 4a and the operation depicted in FIG. 4b, until a preselected desired number of duplex copies of the stack has been reproduced. The resultant desired number of duplex copies are thus produced, such production occurring in page sequential order.

Figure 5A:
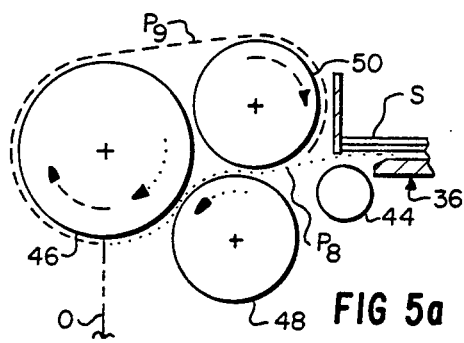
FIGS. 5a and 5b are side elevational views of the feeder of FIG. 1 showing its operation for enabling the production of simplex copies from duplex documents.
Figure 5B:
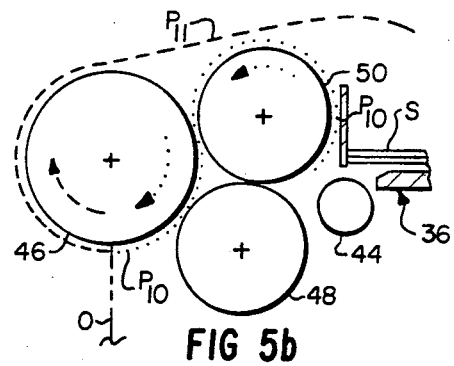

The mode of operation of the feeder 10 for forming simplex copies of duplex document sheets is shown in FIGS. 5a, 5b, with the copying of even numbered pages depicted in FIG. 5a and odd numbered pages depicted in FIG. 5b. Again, the document sheets in the stack S are in page sequential order, the first page on top. Of course, with duplex documents the odd pages of information are face up in the hopper 36 and the even pages of information are face down. The bottom-most sheet is transported from stack S by mechanism 44 and is directed along the path $P_8$ (dotted line) in FIG. 5a to the peripheral surface of cylinder 48 (rotating counter-clockwise), and then handed off to cylinder 46 (rotating clockwise). The document sheet is tacked to the peripheral surface of the cylinder 46 and transported in the appropriate direction past the optical path O of the exposure station to form a wrong-reading image on the drum 16. Such image is thereafter developed and transferred directly right-reading to a receiver sheet to produce a simplex copy of the even page side of the document sheet. After exposure, the document sheet is transported along the path $P_9$ (dashed line) to the cylinder 50. The document sheet is tacked to the peripheral surface of the cylinder 50 as the cylinder rotates in a clockwise direction.

When the cylinder 50 has rotated through an angle where the trail edge of the document sheet is tacked to its peripheral surface, the direction of rotation of such cylinder is reversed (i.e., it rotates counter-clockwise). As shown in FIG. 5b, the document sheet is thus transported along the path $P_{10}$ (dotted line) and handed off from the cylinder 50 to the cylinder 46 (rotating clockwise). This operation has the effect of turning the document sheet over so that when its is transported in the appropriate direction past the optical path O of the exposure mechanism 20 by the cylinder 46, a wrong-reading image of the opposite side (odd page side) of the sheet is formed on the drum 16. Such image is thereafter developed and transferred directly right-reading to a subsequent receiver sheet to produce a simplex copy of the odd page side of the document sheet. After exposure the document sheet is transported along path $P_{11}$ (dashed line) back to the hopper 36 in a manner similar to that described with reference to FIG. 3. Accordingly, the document sheet is received in the hopper 36 in the original orientation (i.e. odd page face up). This cycle is repeated for each duplex document sheet in the stack S the number of times corresponding to a preselected desired number of simplex copies of such stack. The resultant desired number of simplex copies are thus produced, such production occurring in page sequential order.

Figure 6A:
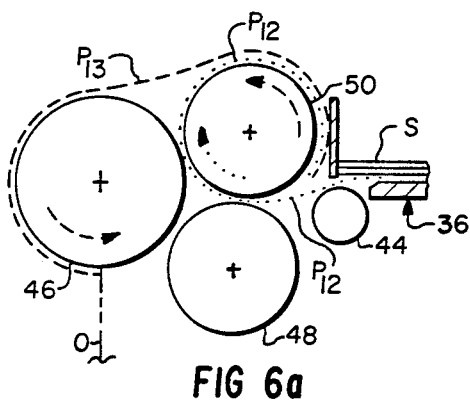
FIGS. 6a and 6b are side elevational views of the feeder of FIG. 1 showing its operation for enabling the production of duplex copies from duplex documents.
Figure 6B:
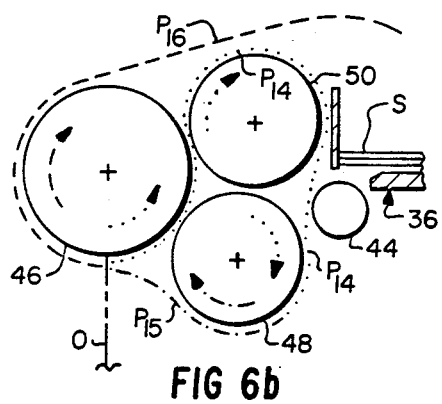

The mode of operation of the feeder 10 for forming duplex copies of duplex document sheets is shown in FIGS. 6a, 6b, with the copying of even numbered pages depicted in FIG. 6a and odd numbered pages depicted in FIG. 6b. As above, the duplex document sheets in the stack S are in page sequential order with odd pages face up in the hopper 36 and even pages face down. The bottom-most sheet is transported from stack S by mechanism 44 and is directed along the path $P_{12}$ (dotted line) in FIG. 6a to the peripheral surface of cylinder 50 (rotating clockwise) and tacked to such surface. Rotation of the cylinder 50 continues until the trial edge of the document sheet is located substantially beyond the point of nip relation between the cylinders 50 and 46. The drive for cylinder 50 is then reversed to rotate the cylinder 50 counter-clockwise. The document sheet is then stripped from the cylinder 50 and directed along the path $P_{13}$ (dashed line) to the cylinder 46 where it is tacked to the peripheral surface of such cylinder. The cylinder 46 is rotated counter-clockwise to transport the document sheet in the appropriate direction past the optical path O of the exposure station to form a right-reading image on the drum 16. Such image is thereafter developed and transferred wrong-reading to the donor/transfer roller 30 and then right-reading to the back side of a receiver sheet as described above.

After exposure, the document sheet is transported along the path $P_{14}$ (dotted line), as shown in FIG. 6b, and is handed off from cylinder 46 to cylinder 50 (rotating clockwise). When the document sheet is completely received on the peripheral surface of cylinder 50, rotation of cylinder 46 is reversed (to rotate counter-clockwise). Such document sheet is directed from the clockwise rotating cylinder 50 to the clockwise rotating cylinder 48 along the dotted line path $P_{14}$, and then back to cylinder 46 along the path $P_{15}$ (dot/dash line). This operation has the effect of turning over the document sheet so that when it is transported in the appropriate direction past the optical path of the exposure mechanism 20 by the counter-clockwise rotating cylinder 46, a wrong-reading image of the opposite side the sheet is formed on the drum 16. Such image is thereafter developed and transferred directly right-reading to the front side of the aforementioned receiver sheet. The logic and control unit L controls the timing of operation of the feeder 10 and the reproduction apparatus 12 in a manner similar to that described with reference to FIGS. 4a, 4b, such that the sequentially formed images of the duplex document sheet are transferred simultaneously to opposite sides of the same receiver sheet to produce a duplex copy of such duplex document sheet. After exposure the document sheet is transported along path $P_{16}$ (dashed line) back to the hopper 36 in a manner similar to that described with reference to FIG. 3. Accordingly, the document sheet is received in the hopper 36 in its original orientation (i.e. odd page face up) This cycle is repeated for each duplex document sheet in the stack S for the number of times corresponding to a preselected desired number of copies of such stack. The resultant desired number of duplex copies are thus produced, such production occurring in page sequential order.

The invention has been described in detail with particular reference to preferred embodiments thereof, but it will be understood that variations and modifications can be effected within the spirit and scope of the invention.

I claim:

1. A document feeder for recirculating simplex or duplex document sheets in a sheet stack to and from a scanning station of a reproduction apparatus of the type including a donor member for producing simplex copies of simplex document sheets, duplex copies of simplex document sheets, duplex copies of simplex document sheets, or duplex copies of duplex document sheets, said document feeder comprising:
   means for holding a stack of document sheets;
   a first rotatably mounted cylinder located in spaced relation to said stack holding means and in juxtaposition with said scanning station, said cylinder including means for selectively tacking a document sheet to the peripheral surface thereof;
   second and third rotatably mounted cylinders, located between said stack holding means and said first cylinder in substantial nip relation with said first cylinder and with one another, said second and third cylinders respectively including means for selectively tacking a document sheet to the peripheral surface thereof;

means for bidirectionally rotating said first, second and third cylinders;

means for transporting a document sheet from said stack holding means into the nip between said second and third cylinder; and control means, operatively associated with said bidirectional rotating means, said transporting means, and said tacking means for effecting transport of simplex of duplex document sheets seriatem from said stack holding means past said scanning station and back to said stack holding means in proper orientation and direction of transport to enable the desired production of simplex or duplex copies.

2. The invention of claim 1 wherein said bidirectional rotating means is controlled by said control means to rotate said first cylinder in one direction past said scanning station for production of simplex copies of simplex and duplex document sheets.

3. The invention of claim 2 wherein, when making simplex copies of simplex document sheets said bidirectional rotating means is controlled by said control means to rotate said second cylinder in one direction to remove a document sheet from said stack holding means and thereafter rotate said second cylinder in an opposite direction to transport such document sheet to said first cylinder in a turned over orientation.

4. The invention of claim 2 wherein, when making simplex copies of duplex document sheets, said bidirectional rotating means is controlled by said control means to rotate said second cylinder in one direction to transport a document sheet to said first cylinder, and to rotate said third cylinder first in one direction to remove such document sheet from said fist cylinder, and then in an opposite direction to transport such document sheet back to said first cylinder in a turned over orientation.

5. The invention of claim 1 wherein, for production of duplex copies of simplex document sheets, said bidirectional rotating means is controlled by said control means to alternately rotate said first cylinder in opposite directions past said scanning station for copying of sequential document sheets.

6. The invention of claim 5 wherein, when making duplex copies of simplex document sheets, said bidirection rotating means is controlled by said control means to rotate said second cylinder in one direction for the first and every other document sheet to transport such sheets from said first cylinder after reproduction to said third cylinder, and to rotate said third cylinder in one direction to respectively receive such document sheets from said second cylinder and in an opposite direction to return such document sheets to said stack holding means in an orientation similar to its original orientation therein; and, for the second and every other document sheet, to rotate said second cylinder in an opposite direction to its said first direction to remove such document sheets from said stack holding means and thereafter rotate said second cylinder in said first direction to transport such document sheets to said first cylinder in a turned over orientation.

7. The invention of claim 1 wherein, for making duplex copies of duplex document sheets, said bidirectional rotating means is controlled by said control means to alternately rotate said first cylinder in opposite directions past said scanning station for respectively copying of opposite sides of a duplex document sheet.

8. The invention of claim 7 wherein, when making duplex copies of duplex document sheets, said bidirectional rotating means is controlled by said control means to rotate said third cylinder in a first direction to remove a document sheet from said stack holding means and thereafter rotate said third cylinder in an opposite direction to its said first direction to transport document sheet to said first cylinder in a turned over orientation to present one side of such document sheet to said scanning station; and after reproduction of said one side of such document sheet, to rotate said third cylinder in its first direction to remove such document sheet from said first cylinder and transport such document sheet to said second cylinder, and rotate said second cylinder in one direction to transport such document sheet from said third cylinder to said first cylinder in a turned over orientation to present the opposite side of such document sheet to said scanning station.

* * * * *